United States Patent
Obama

[11] Patent Number: 6,014,266
[45] Date of Patent: Jan. 11, 2000

[54] ZOOM LENS FOCUSING SYSTEM AND METHOD

[75] Inventor: Akihiko Obama, Sakura, Japan

[73] Assignee: Nikon Corporation, Tokyo, Japan

[21] Appl. No.: 09/120,217

[22] Filed: Jul. 21, 1998

[30] Foreign Application Priority Data

Jul. 22, 1997 [JP] Japan .................................. 9-196172
May 20, 1998 [JP] Japan .................................. 10-138196

[51] Int. Cl.$^7$ .................................................. G02B 15/14

[52] U.S. Cl. ........................ 359/689; 359/690; 359/780; 359/784

[58] Field of Search ........................... 359/689, 676–687, 359/690, 691, 692

[56] References Cited

U.S. PATENT DOCUMENTS 5,570,234 10/1996 Shibata .................................... 359/690

*Primary Examiner*—Georgia Epps
*Assistant Examiner*—Timothy J Thompson
*Attorney, Agent, or Firm*—Downs Rachlin & Martin PLLC

[57] ABSTRACT

A zoom lens focusing system for and method of focusing from an infinite to a close distance. The system includes a zoom lens comprising a plurality of lens groups each being axially movable to define a plurality of positional states and focal length for each positional state. Each of the plurality of lens groups moves for focusing such that the ratios of movement amounts of the respective lens groups vary as a function of the focal length. The method includes the steps of providing the above-described zoom lens, and then focusing by moving the plurality of lens groups such that the ratios of movement amounts of the respective lens groups vary as a function of the focal length. The focusing system and method each preferably satisfy a number of conditions.

4 Claims, 13 Drawing Sheets

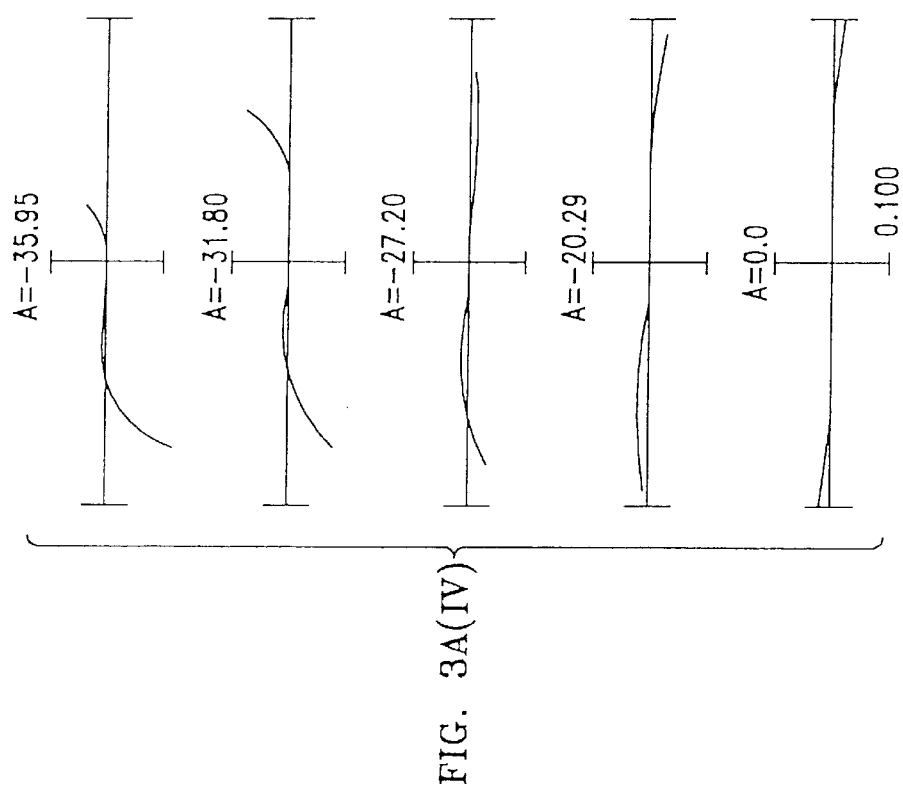
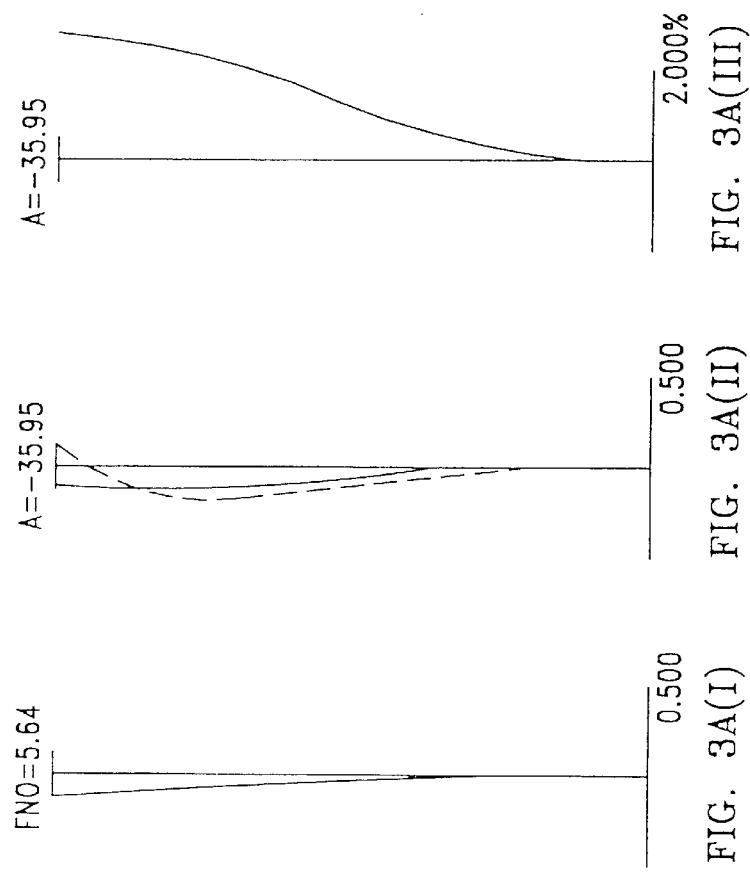

FIG. 3B(II)
FIG. 3B(III)
FIG. 3B(IV)

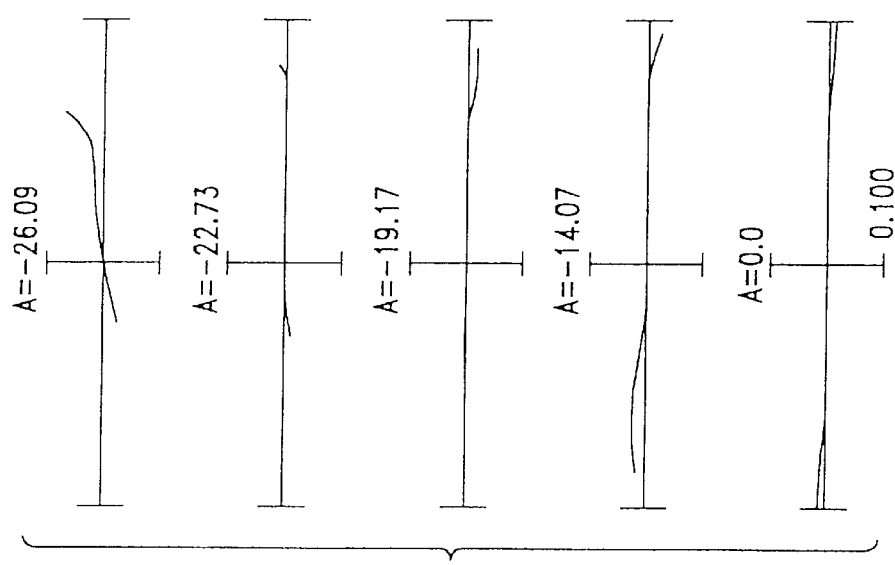
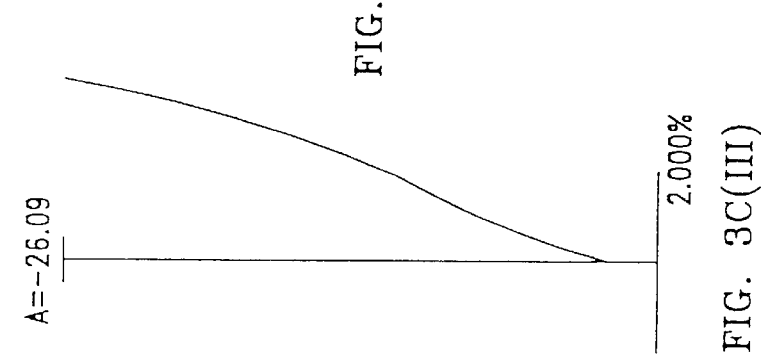
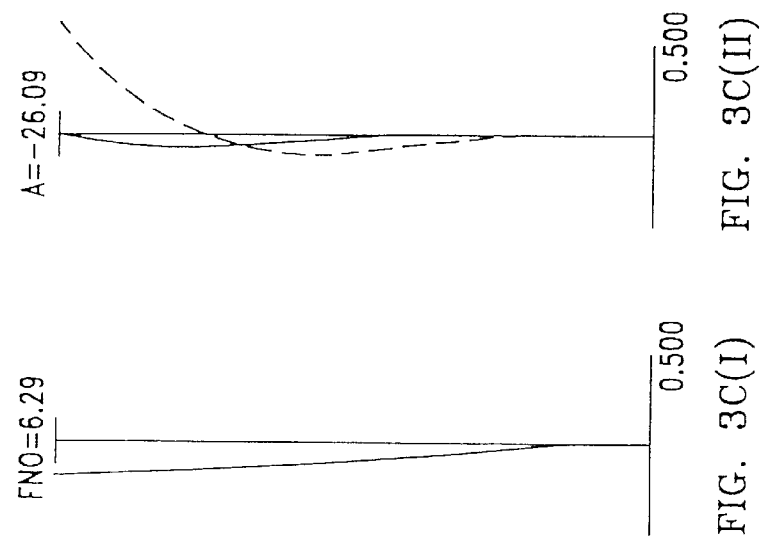
FIG. 3C(I)   FIG. 3C(II)   FIG. 3C(III)
FIG. 3C(IV)

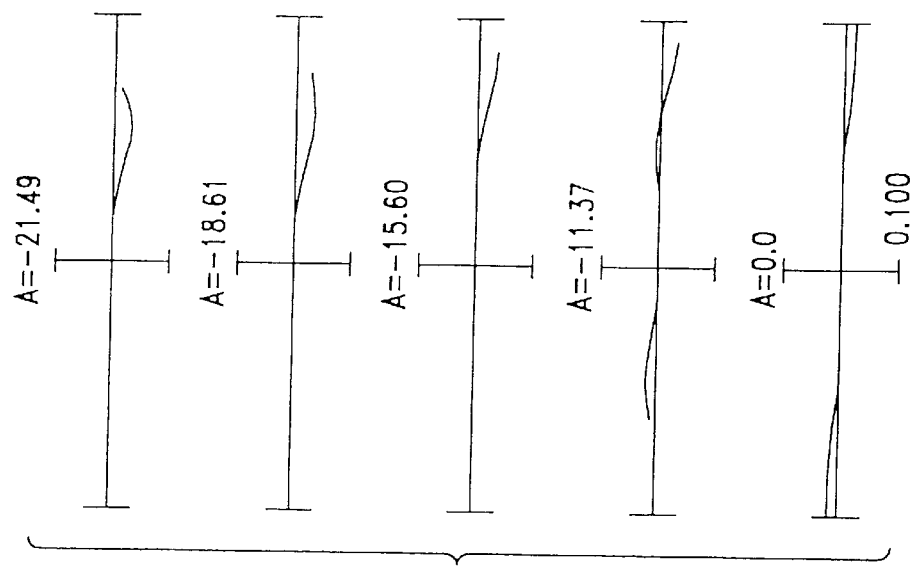
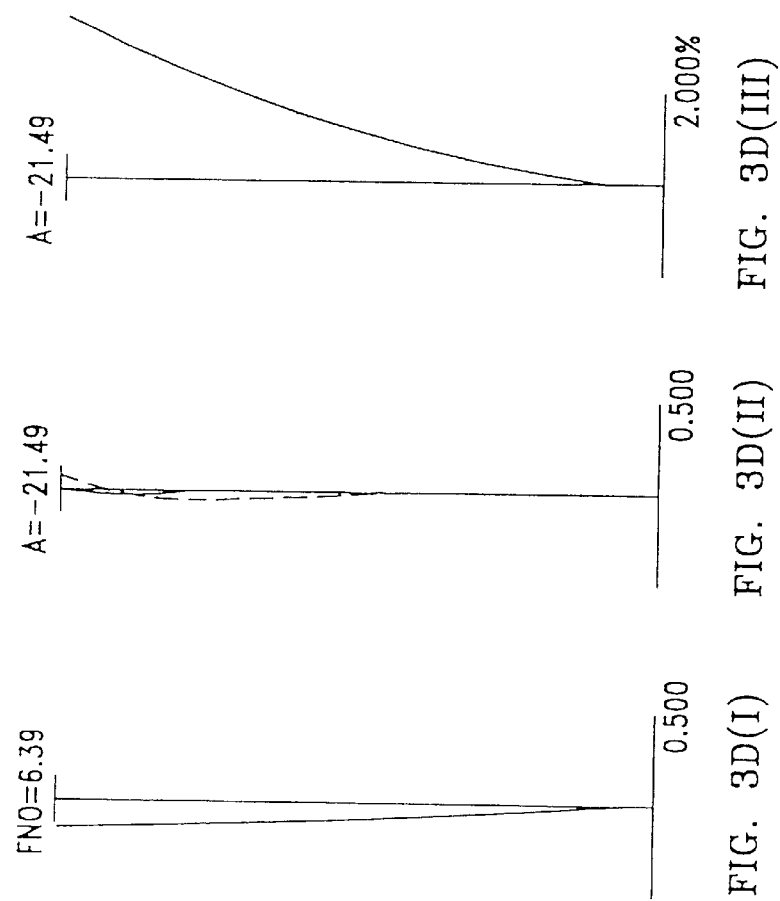
FIG. 3D(I)  FIG. 3D(II)  FIG. 3D(III)  FIG. 3D(IV)

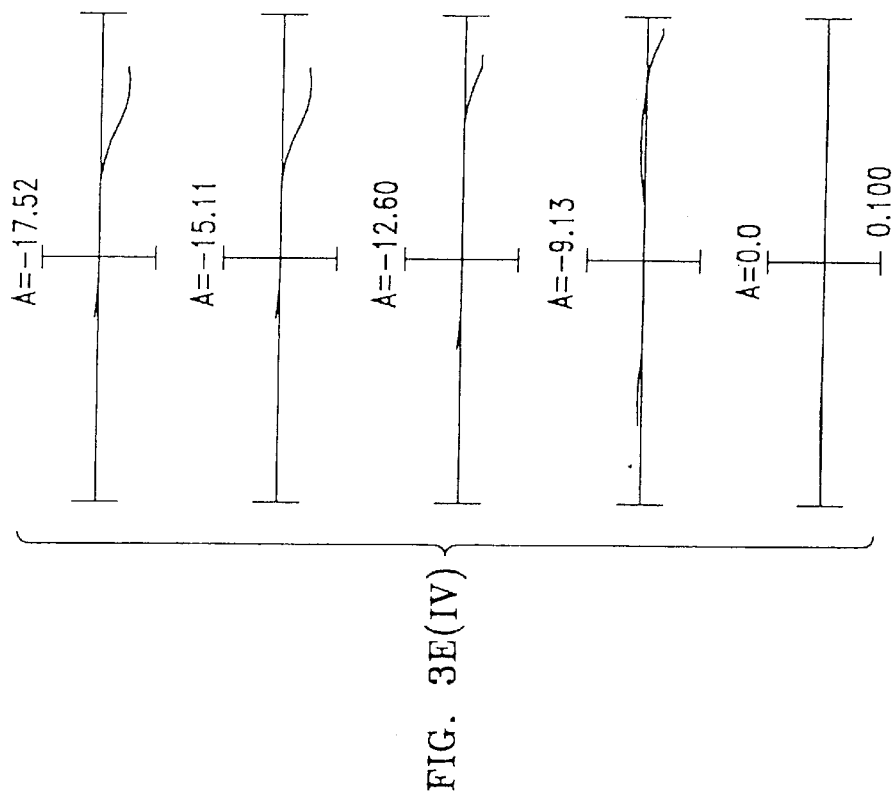
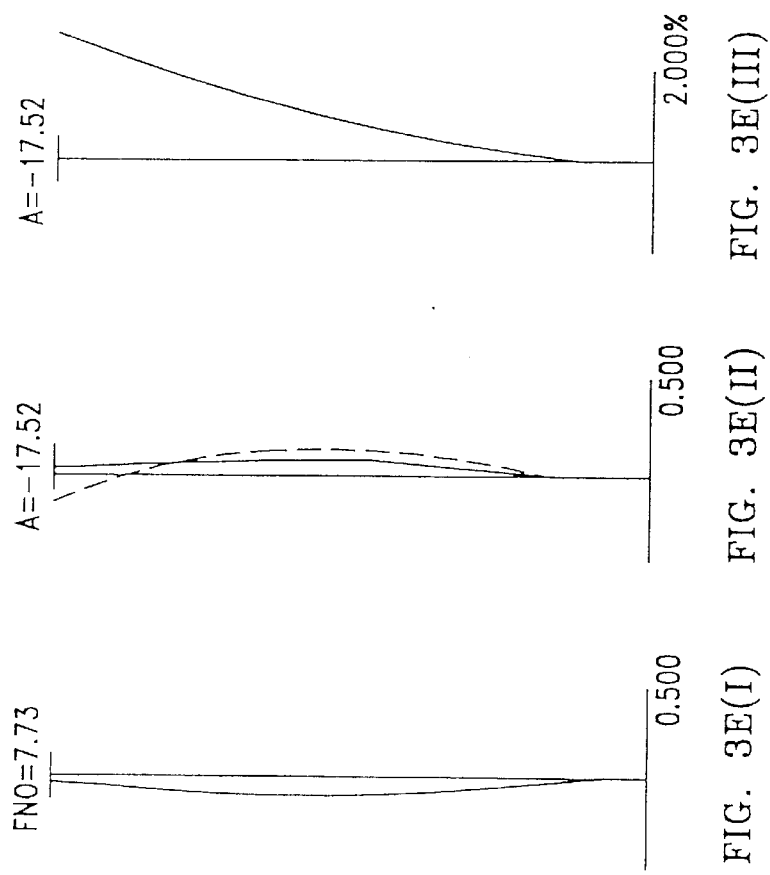
FIG. 3E(I)  FIG. 3E(II)  FIG. 3E(III)
FIG. 3E(IV)

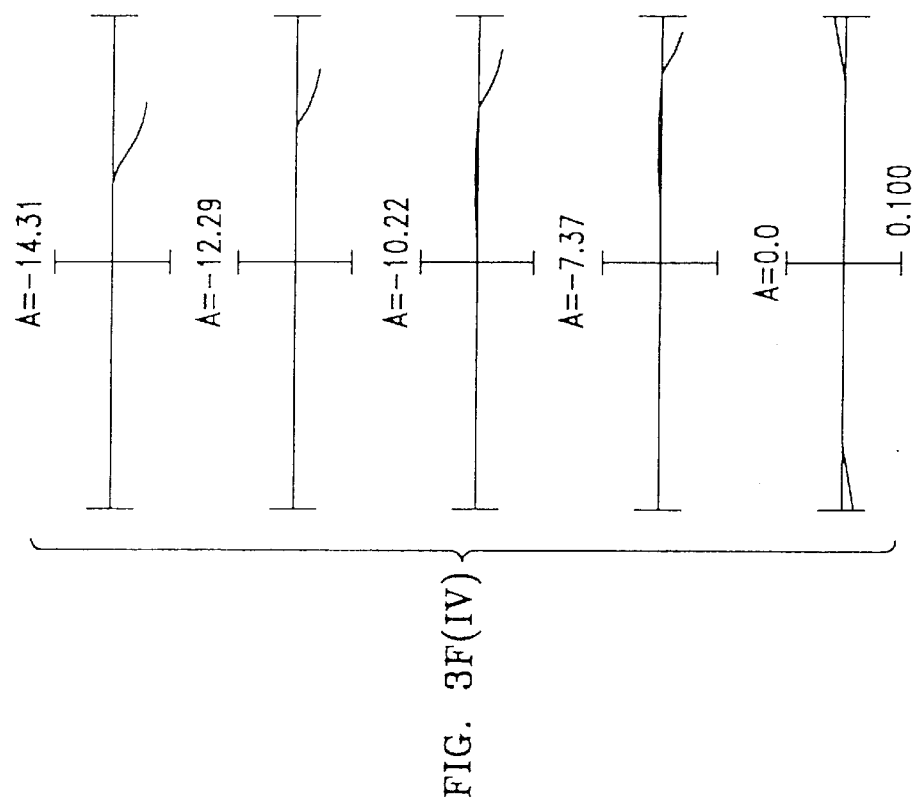
FIG. 3F(IV)
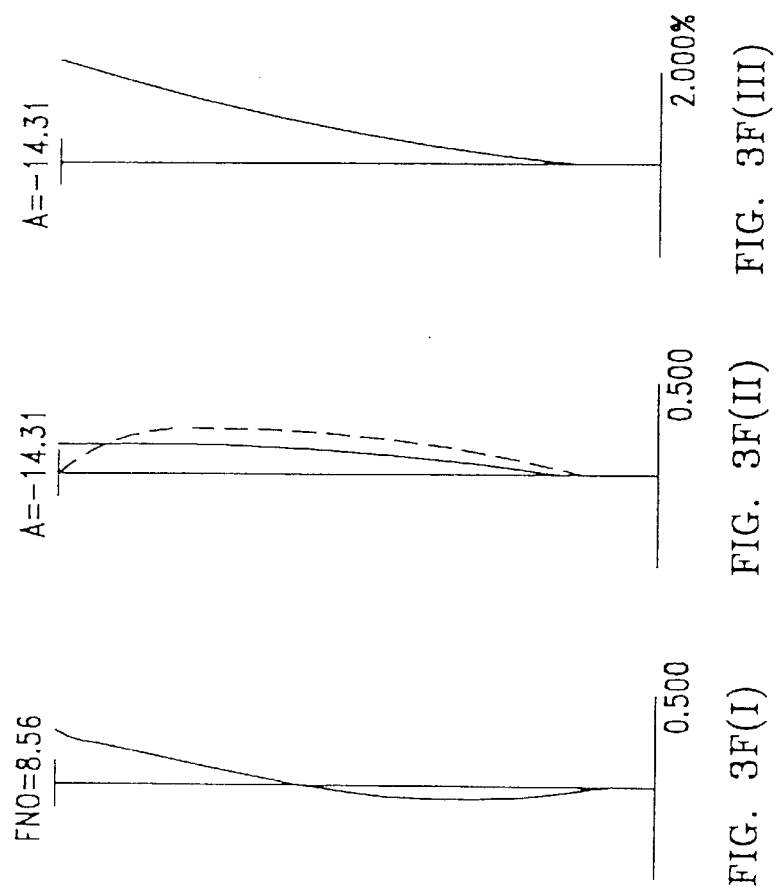
FIG. 3F(I)  FIG. 3F(II)  FIG. 3F(III)

FIG. 3G(II)

FIG. 3G(III)

FIG. 3G(IV)

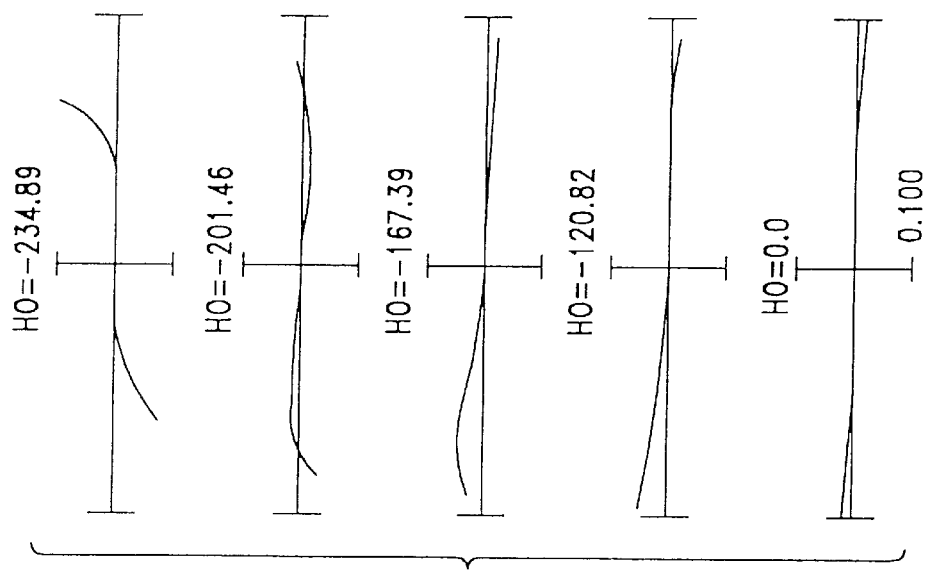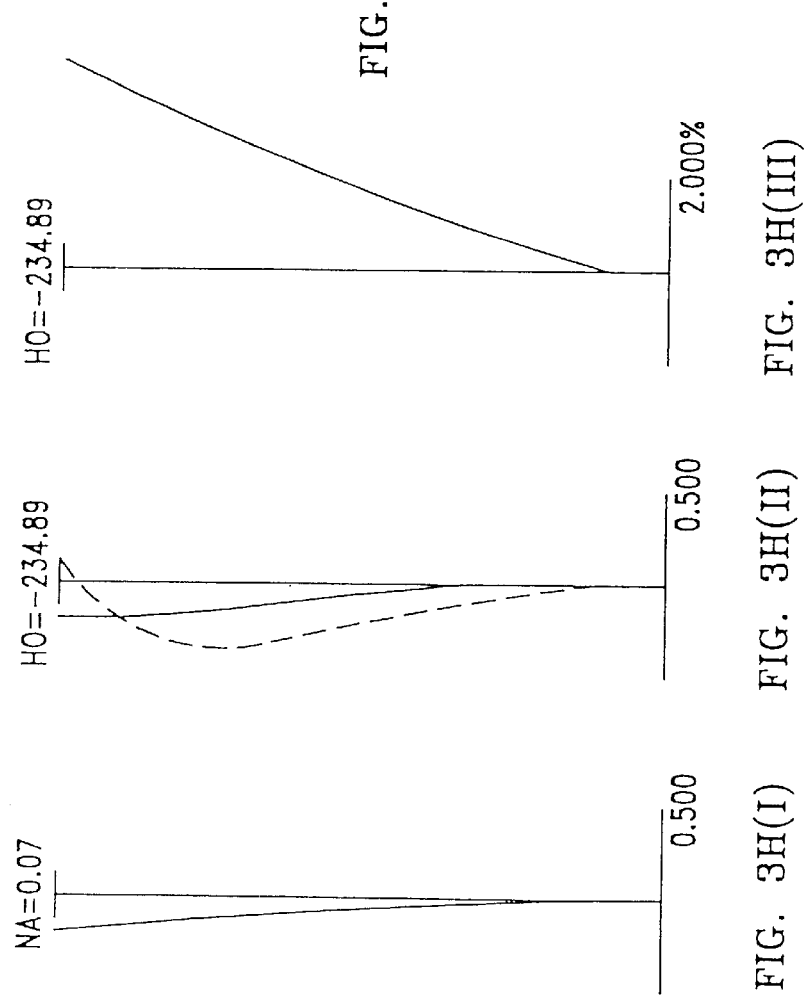

FIG. 3I(IV)

FIG. 3I(III)

FIG. 3I(II)

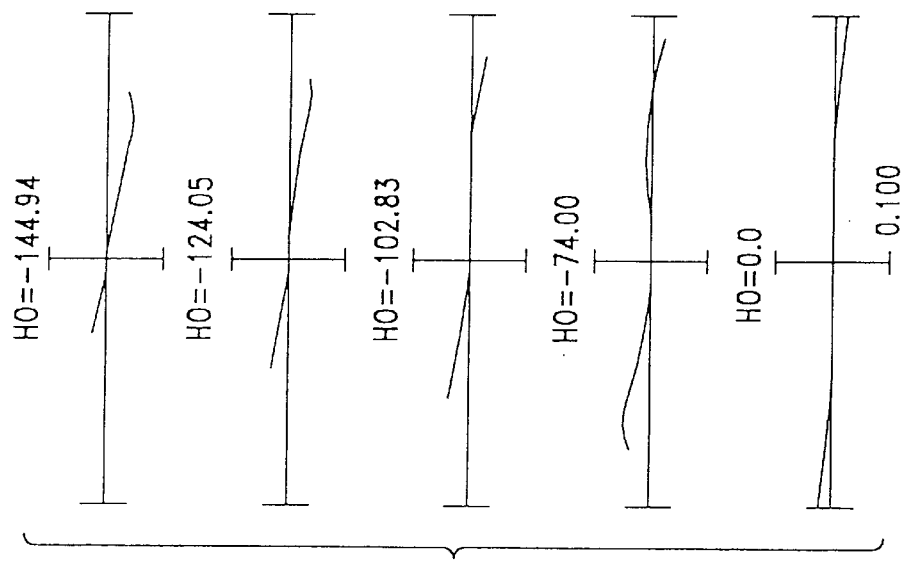
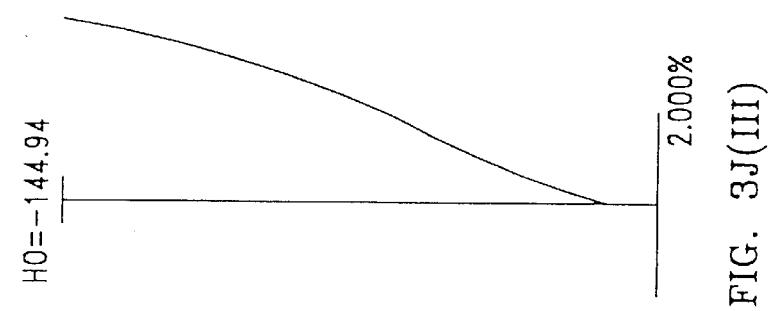
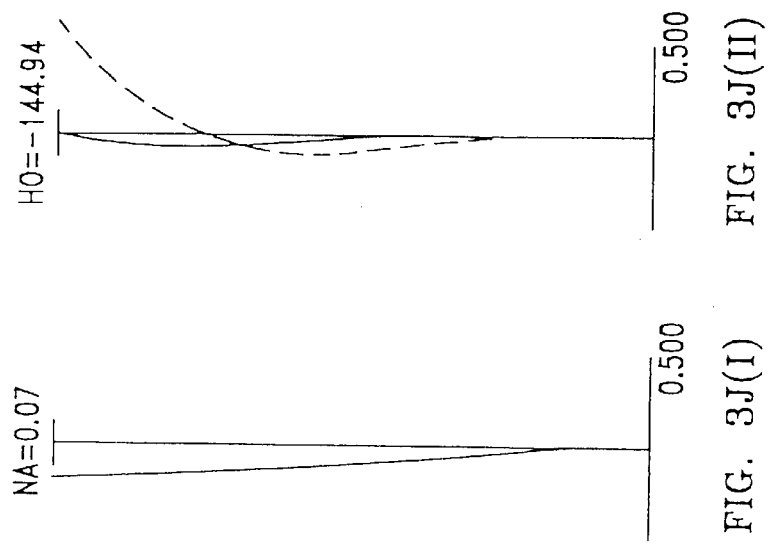
FIG. 3J(I)  FIG. 3J(II)  FIG. 3J(III)
FIG. 3J(IV)

FIG. 3K(IV)

FIG. 3K(III)

FIG. 3K(II)

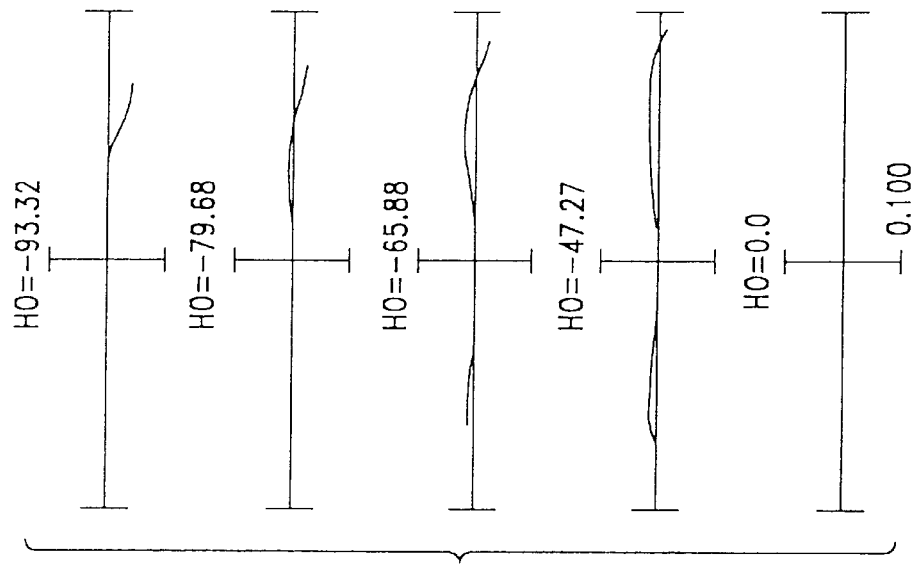
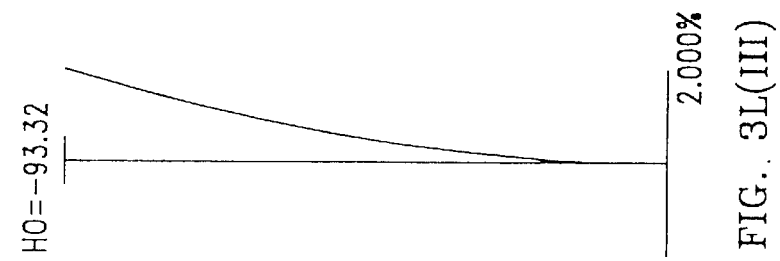
FIG. 3L(IV)
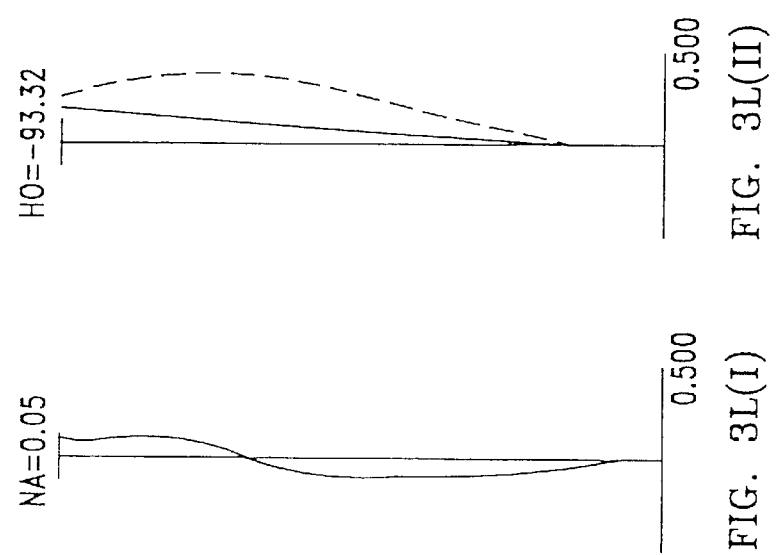
FIG. 3L(I)  FIG. 3L(II)  FIG. 3L(III)

ZOOM LENS FOCUSING SYSTEM AND METHOD

FIELD OF THE INVENTION

The present invention pertains to a zoom lens focusing system and method and particularly to such systems and methods suitable for use with compact lens-shutter-type cameras, compact digital cameras, and the like.

BACKGROUND OF THE INVENTION

In recent years, zoom lens (i.e., variable magnification) optical systems (hereinafter, simply "zoom lenses") have come into common use as photographic lenses in lens-shutter-type cameras, and in particular, zoom ratios in excess of two are rapidly becoming standard.

Zoom lenses with high zoom ratios frequently employ three or more movable lens groups, the main reason is that such zoom lenses offer a large capability for correcting aberrations as compared with two-group zoom lenses so that the lenses increase the selectivity of the loci of movement of the respective lens groups while zooming from the extreme wide-angle state to the extreme telephoto state. This large number stems from the increase in the number of degrees of freedom of the loci of movement of the respective lens groups in changing (i.e., "zooming") from the extreme wide-angle state to the extreme telephoto state as compared with two-group zoom lenses. Another reason is that variations in off-axis aberrations accompanying changes in the focal length (i.e., positional) state of the lens can be satisfactorily corrected because there is a relatively small change in lateral magnification with a change in the positional states of the lens groups.

The positive-positive-negative three-group type of zoom lens is conventionally known to possess a comparatively small number of lenses and to be suited to applications requiring compactness. Focusing for such zoom lenses may be accomplished by movement of either all or a part of the lens system. A zoom lens where focusing is accomplished as a result of moving only part of the lens system is disclosed in Japanese Laid-Open Patent Application (Kokai) No. Hi [1989]-204013 and in Japanese Laid-Open Patent Application (Kokai) No. H2 [1990]-16515.

In zoom lenses where the entire lens system is moved during focusing, one focusing method involves moving the entire lens system in unison, and another focusing method involves moving the lens groups in different ratios. In the latter focusing method, it is known to carry out focusing such that the ratio or ratios governing the amounts by which the respective lens groups move remain(s) constant over the entire range of positional states from the extreme wide-angle state to the extreme telephoto state.

In the focusing methods disclosed at the aforementioned Japanese Laid-Open Patent Applications (Kokai) No. H1 [1989]-204013 and No. H2[1990]-16515 focusing is carried out using lens groups to the rear (i.e., imagewise) of the first lens group. Unfortunately, with this system, it has proven impossible to keep variations in aberrations to a minimum during focusing, and to maintain good imaging performance over all the positional states from the extreme wide-angle state to the extreme telephoto state. The main reason for this is the large variation in the location at which off-axis light beams pass through the first (i.e., most objectwise) lens group during focusing.

In the focusing method where the entire lens system moves in unison, it has proven impossible to keep variations in aberration to a minimum, and to maintain good imaging performance. This is due to the large variation in the location at which off-axis light beams pass through the lens groups to the front and rear of and on either side of the aperture stop during focusing.

In the focusing method where the lens groups move in different ratios, it is known to achieve focusing where the ratio(s) governing the amounts by which the respective lens groups move constant over the entire range of positional states from the extreme wide-angle state to the extreme telephoto state. However, it has been impossible to keep variations in aberration to a minimum during focusing, and to maintain good imaging performance, over the entire range of magnifications. The main reason for this is that the locations at which off-axis light beams pass through the lens groups to the front and rear of and on either side of the aperture stop vary greatly with the change in magnification of the zoom lens when going from the extreme wide-angle state to the extreme telephoto state.

SUMMARY OF THE INVENTION

The present invention pertains to a zoom lens focusing system and method for same and particularly to such systems and methods suitable for use with compact lens-shutter-type cameras, compact digital still cameras, and the like. An objective of the present invention is to provide a zoom lens focusing system and method that solves the above-mentioned problems and allows for good imaging performance to be maintained by controlling variations in aberrations during focusing over all positional states from the extreme wide-angle state to the extreme telephoto state. The present invention accomplishes this objective by changing the positional states of all of the lens groups when focusing from an infinite distance to a close distance, and making the ratios of amounts by which respective lens groups move for focusing vary as a function of the overall focal length of the zoom lens, which changes with the positional state of the lens.

A first aspect of the invention is a method of focusing from an infinite to a close distance. The method comprises the steps of first, providing a zoom lens comprising a plurality of lens groups. Each lens group is axially moveable so as to define a plurality of zoom lens positional states. Also, the zoom lens has an overall focal length that varies as a function of the positional states. Then, the next step is focusing by moving each one of the plurality of lens groups such that the ratios of amounts by which the lens groups move vary as a function of the overall focal length.

A second aspect of the invention involves the method of the first aspect of the invention, described above, wherein the step of providing the zoom lens includes providing, objectwise to imagewise, a first lens group having positive refractive power, a second lens group having positive refractive power and separated from the first lens group by a first air space, and a third lens group having negative refractive power and separated from the second lens group by a second air space. The plurality of zoom lens positional states includes an extreme wide-angle positional state and an extreme telephoto positional state. The lens groups are designed such that, when changing from the extreme wide-angle state to the extreme telephoto state, they move toward the object-side so as to cause the first air space to increase, and the second air space to decrease. The next step is focusing from an infinite distance to a short distance by moving the lens groups by respective amounts of movement such that ratios of the respective amounts of movement are a function of the overall focal length. Also, during the focusing step, the following conditions are satisfied:

(1) Δ1>0

(2) Δ2>0

(3) Δ2W/Δ1W≦1.0

(4) Δ3T/Δ2T≦1.0 wherein Δ1 and Δ2 are the amounts of movement by the first and second lens groups, respectively, during focusing, Δ1W and Δ2W are the amounts of movement by the first and second lens group, respectively, during focusing when the zoom lens is in the extreme wide-angle state, and Δ2T and Δ3T are the amounts of movement by the second and third lens groups, respectively, during focusing when the zoom lens is in the extreme telephoto state. The amounts of movement are taken to be positive when toward the object-side.

A third aspect of the present invention is a zoom lens focusing system capable of focusing from an infinite to a close distance. The system comprises providing a zoom lens comprising a plurality of lens groups and including a plurality of positional states each with an overall focal length. The zoom lens designed such that, to achieve focusing for any of the positional state of the zoom lens, each one of the plurality of lens groups moves such that ratios of amounts by which the lens groups move vary as a function of the overall focal length.

A fourth aspect of the invention is a zoom lens focusing system as described above, wherein the zooms lens comprises, objectwise to imagewise, a first lens group having positive refractive power, a second lens group having positive refractive power and separated from the first lens group by a first air space, and a third lens group having negative refractive power and separated from the second lens group by a second air space, the plurality of zoom lens positional states including an extreme wide-angle positional state and an extreme telephoto positional state. The zoom lens is designed such that, when changing from the extreme wide-angle state to the extreme telephoto state, the lens groups move toward the object-side so as to cause the first air space to increase, and the second air space to decrease. Further, focusing from an infinite distance to a close distance is accomplished by moving the lens groups by respective amounts for focusing such that ratios of these respective amounts of movement for focusing are a function of the overall focal length. The zoom lens also satisfies the conditions:

(1) Δ1>0

(2) Δ2>0

(3) Δ2W/Δ1W≦1.0

(4) Δ3T/Δ2T≦1.0 wherein Δ1 and Δ2 are the amounts of movement for focusing by the first and second lens groups, respectively, during focusing, Δ1W and Δ2W are the amounts of movement for focusing by the first and second lens groups, respectively, during focusing when the zoom lens is in the extreme wide-angle state, and Δ1 and Δ2T are the amounts of movement for focusing by the first and second lens groups, respectively, during focusing when the zoom lens is in the extreme telephoto state. The amounts of movement for focusing are positive when the movement is toward the object.

A fifth aspect of the invention is the zoom lens focusing system as described above, wherein the zoom lens has a wide-angle focal length range and a telephoto focal length range given respectively by (5) $f_W < f \leq f_W^{3/4} \cdot f_T^{1/4}$ (6) $f_W^{3/4} \cdot f_T^{1/4} < f < f_T$ and the zoom lens satisfies the conditions:

(7) $-0.2 < \Delta 3L / \Delta 2L < 0.75$ (8) $0.4 < \Delta 3H / \Delta 2H < 0.98$ wherein f is the overall focal length, $f_W$ is the overall focal length in the extreme wide-angle positional state, $f_T$ is the overall focal length in the extreme telephoto positional state, Δ2L and Δ3L are the amounts of movement for focusing by the second and third lens groups, respectively, during focusing while in the wide-angle focal length range, and Δ2H and Δ3H are the amounts of movement for focusing by the second and third lens groups, respectively, during focusing while in the telephoto focal length range.

BRIEF DESCRIPTION OF THE DRAWINGS

FIGS. 3A(I)–3A(IV) are aberration plots for spherical, astigmatism, distortion and coma, respectively, for the first embodiment of the present invention, when focused on an object at an infinite distance while the zoom lens is in lens positional state P1 (the extreme wide-angle state);

FIGS. 3C(I)–3C(IV) are aberration plots for spherical, astigmatism, distortion and coma, respectively, for the first embodiment of the present invention, when focused on an object at an infinite distance while the zoom lens is in lens positional state P3;

FIGS. 3D(I)–3D(IV) are aberration plots for spherical, astigmatism, distortion and coma, respectively, for the first embodiment of the present invention, when focused on an object at an infinite distance while the zoom lens is in lens positional state P4;

FIGS. 3E(I)–3E(IV) are aberration plots for spherical, astigmatism, distortion and coma, respectively, for the first embodiment of the present invention, when focused on an object at an infinite distance while the zoom lens is in lens positional state P5;

FIGS. 3F(I)–3F(IV) are aberration plots for spherical, astigmatism, distortion and coma, respectively, for the first embodiment of the present invention, when focused on an object at an infinite distance while the zoom lens is in lens positional state P6 (the extreme telephoto state);

FIGS. 3H(I)–3H(IV) are aberration plots for spherical, astigmatism, distortion and coma, respectively, for the first embodiment of the present invention, when focused on an object at a distance of 0.45 m while in lens state P2;

FIGS. 3J(I)–3J(IV) are aberration plots for spherical, astigmatism, distortion and coma, respectively, for the first embodiment of the present invention, when focused on an object at a distance of 0.45 m while in lens state P4;

FIGS. 3L(I)–3L(IV) are aberration plots for spherical, astigmatism, distortion and coma, respectively, for the first embodiment of the present invention, when focused on an object at a distance of 0.45 m while in lens state P6 (the extreme telephoto state).

DETAILED DESCRIPTION OF THE INVENTION

The present invention pertains to a zoom lens focusing system and method and particularly to such systems and methods suitable for use with compact lens-shutter-type cameras, compact digital still cameras, and the like. An objective of the present invention is to provide a zoom lens focusing system and method that solves the above-mentioned problems and allows for good imaging performance to be maintained by controlling variations in aberrations during focusing over all positional states from the extreme wide-angle state to the extreme telephoto state. The present invention accomplishes this objective by changing the positional states of all of the lens groups when focusing from an infinite distance to a close distance, and making the ratios of amounts by which respective lens groups move for focusing vary as a function of the overall focal length of the zoom lens, which changes with the positional state of the lens.

A condition for preventing large variations in aberrations during focusing is preventing large variations in the locations at which light beams pass through the respective lens groups as a result of focusing. For the focusing method to achieve this condition, it is necessary to vary the positional states of all of the lens groups, and moreover, to appropriately select the ratio(s) defining the respective amounts by which the several lens groups move during focusing.

Zoom lenses, by definition, possess at least two focal length states. Thus, focusing while keeping constant the ratio(s) over which the lens groups move prevents control of variations in aberrations during focusing over the range of focal lengths (i.e., positional states) outside of the focal length at which the suitable movement ratio was selected. Accordingly, it is desirable to carry out focusing such that at each of the several overall focal lengths from the extreme wide-angle state to the extreme telephoto state, a different ratio, which is suitable thereto, governs the movement of the lens groups. Furthermore, by exploiting the small variations in aberrations during focusing, it is possible to maintain good imaging performance during focusing as a result of attaining good imaging performance at all of the respective focal length states from the extreme wide-angle state to the extreme telephoto state.

Figure 1:
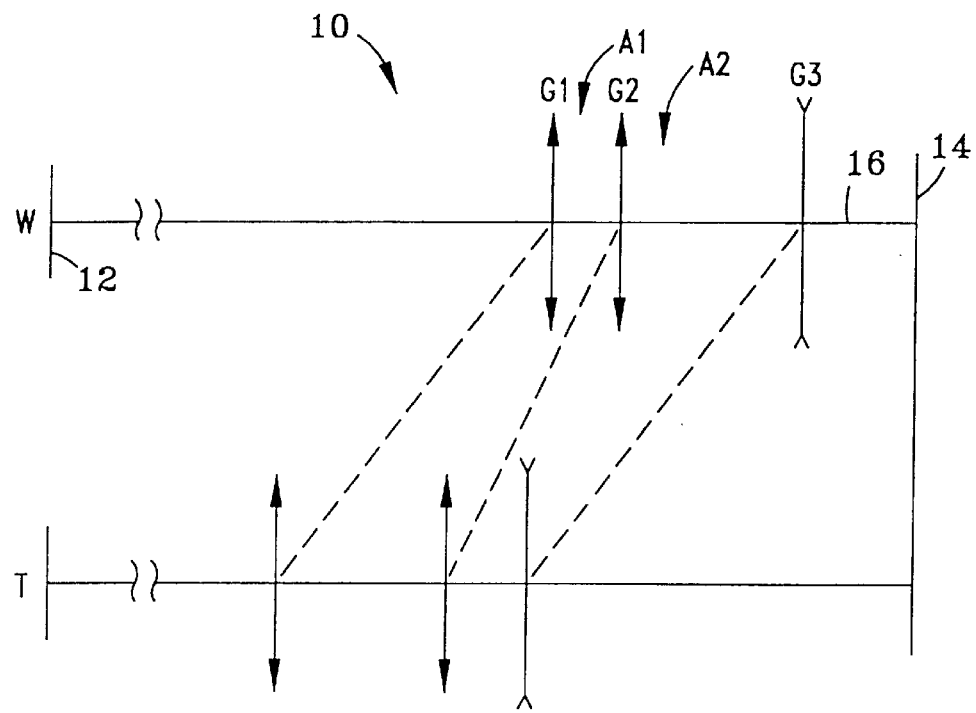
FIG. 1 is a schematic optical sectional diagram of the arrangement of refractive power in the zoom lens of the present invention, with dashed-lines showing the axial motion of the lens groups when zooming from the extreme wide angle state (W) to the extreme telephoto state (T)

The zoom lens focusing system and method of the present invention is now described. Referring to FIG. 1, a zoom lens 10 comprises, in order from an object plane 12 to an image plane 14 along an optical axis 16 (i.e., objectwise to imagewise), a first lens group G1 having positive refractive power, a second lens group G1 having positive refractive power, and a third lens group G3 having negative refractive power. The lens groups are designed such that they all move toward the object side so as to cause a first variable air space A1 between the first lens group G1 and the second lens group G2 to increase, and a second variable air space A2 between the second lens group G2 and the third lens group G3 to decrease, as the positional state of the lens is changed from the extreme wide-angle state (W) to the extreme telephoto state (T).

Adjusting focus from an infinite distance to a close distance (hereinafter, simply "focusing") is accomplished by changing the positional states of all of the lens groups. The ratio(s) governing the respective amounts by which the lens groups move vary in correspondence with the overall focal length f of zoom lens 10. Accordingly, the present invention allows good imaging performance to be maintained. In this regard, it is preferable that the zoom lens focusing system and method of the present invention satisfy a number of conditions. The first two conditions (1) and (2) are expressed as $$\Delta 1 > 0 \tag{1}$$

$$\Delta 2 > 0 \tag{2}$$

where $\Delta 1$ and $\Delta 2$ are the axial distances moved by first lens group G1 and second lens group G2, respectively, when focusing when zoom lens 10 is in an arbitrary focal length state. Here, and in the conditions below, movement toward object plane 12 is taken to be positive. Also, unless otherwise indicated, all movements are axial (i.e., along axis 16).

Conditions (1) and (2) define the directions of movement of first lens group G1 and second lens group G2 respectively. Below the lower limit of condition (1), there is large variation in the location at which off-axis light beams pass through first lens group G1 when focusing. Thus, large variations in aberrations occur. As such, it is difficult to maintain good imaging performance during focusing. Conversely, below the lower limit of condition (2), when focusing, it is necessary to either move first lens group G1 objectwise by a large amount or move third lens group toward the image side. If first lens group G1 is moved toward the object side by a large amount, then there will be large variation in the location at which off-axis light beams pass through the first lens group. Accordingly, large variations in aberrations occur, which makes it difficult to maintain good imaging performance during focusing. If third lens group G3 is moved imagewise, there will be large variations in the location at which off-axis light beams pass through the third lens group. This results in large variations in aberrations, making it difficult to maintain good imaging performance during focusing, particularly in the extreme wide-angle state.

The third design condition is expressed as $$\Delta 2W/\Delta 1W \leq 1.0 \tag{3}$$

wherein $\Delta 1W$ and $\Delta 2W$ are the distances moved by first lens group G1 and second lens group G2, respectively, during focusing when zoom lens 10 is in the extreme wide-angle state.

Condition (3) defines a ratio of amounts by which first lens group G1 and second lens group G2 should move when focusing on an object at a close distance when the zoom lens is in the extreme wide-angle state.

Above the upper limit of condition (3), i.e., when the amount of movement of second lens group G2 exceeds the amount of movement of first lens group G1 during focusing on an object at a close distance, it is necessary to widen first variable air space A1 in the extreme wide-angle state when focused on an object at an infinite distance. This prevents interference between first lens group G1 and second lens group G2 when focusing on an object at a close distance while in the extreme wide-angle state. However, widening first variable air space A1 when in the extreme wide-angle state causes the refractive powers of the respective lens groups to increase. Because increased refractive power means increased aberrations, good imaging performance is difficult, if not impossible, to achieve in this case.

The fourth design condition (4) is expressed as $$\Delta 3T/\Delta 2T \leq 1.0 \qquad (4)$$

where $\Delta 2T$ and $\Delta 3T$ are the distances moved by second lens group G2 and third lens group G3, respectively, during focusing when zoom lens 10 is in the extreme telephoto state.

Condition (4) defines a ratio of amounts by which second lens group G2 and third lens group G3 should move when focusing on an object at a close distance while in the extreme telephoto state.

Above the upper limit of condition (4), i.e., when the amount of movement of third lens group G3 exceeds the amount of movement of second lens group G2 during focusing on an object at a close distance, it is necessary to widen second variable air space A2 in the extreme telephoto state when focused on an object at an infinite distance. This prevents interference between second lens group G2 and third lens group G3 when focusing on an object at a close distance while in the extreme telephoto state. However, widening second variable air space A2 in the extreme telephoto state causes the refractive powers of the respective lens groups to increase. As mentioned above, increased refractive power means increased aberrations. Thus, good imaging performance is difficult, if not impossible, to achieve.

To keep variations in aberrations at a minimum when focusing on an object at a close distance, and to maintain good imaging performance, it is further preferred that the zoom lens focusing system and method of the present invention satisfy seventh and eighth conditions (7) and (8), set forth below, over what is referred to herein as the "wide-angle focal length range" and the "telephoto focal length range." The wide-angle and telephoto focal length ranges are given respectively by conditions (5) and (6), as $$f_W < f \leq f_W^{3/4} \cdot f_T^{1/4} \qquad (5)$$

$$f_W^{3/4} \cdot f_T^{1/4} < f < f_T \qquad (6)$$

where f is the overall focal length of zoom lens 10, $f_W$ is the overall focal length of zoom lens 10 in the extreme wide-angle state, and $f_T$ is the overall focal length of zoom lens 10 in the extreme telephoto state.

Conditions (7) and (8) are expressed as $$-0.2 < \Delta 3L/\Delta 2L < 0.75 \qquad (7)$$

$$0.4 < \Delta 3H/\Delta 2H < 0.98 \qquad (8)$$

where $\Delta 2L$ and $\Delta 3L$ are the distances moved by second lens group G2 and third lens group G3, respectively, when focusing in the wide-angle focal length range, and $\Delta 2H$ and $\Delta 3H$ are the distances moved by second lens group G2 and third lens group G3, respectively, during focusing in the telephoto focal length range.

Conditions (7) and (8) define ratios of amounts by which second lens group G2 and third lens group G3 should move when focusing on an object at a close distance while in the wide-angle focal length range (5) and the telephoto focal length range (6), respectively.

Below the lower limit of condition (7), there is large variation in the location at which off-axis light beams pass through third lens group G3 when focusing. Accordingly, large variations in aberrations occur and it is difficult to maintain good imaging performance during focusing. Conversely, above the upper limit of condition (7), there is a sharp increase in the amounts by which second lens group G2 and third lens group G3 move when focusing. This results in large variation in the location of off-axis light beams passing through first lens group G1 with focusing. As a result, large variations in aberrations occur, making it difficult to maintain good imaging performance during focusing.

Below the lower limit of condition (8), there is large variation in the location at which off-axis light beams pass through third lens group G3 when focusing. Accordingly, large variations in aberrations occur and it is difficult to maintain good imaging performance during focusing. Conversely, above the upper limit of condition (8), there is a sharp increase in the amounts by which second lens group G2 and third lens group G3 move when focusing. This results in large variations in the location at which off-axis light beams pass through first lens group G1 with focusing. As a result, large variations in aberrations occur, making it difficult to maintain good imaging performance during focusing.

Conditions (7) and (8) specify different ranges because optimal values for controlling the variation in aberrations affecting off-axis light beams during focusing on an object at a close distance differ due to the large difference in the size of first and second variable air spaces A1 and A2 during focusing on an object at an infinite distance when in the wide-angle focal length range versus the telephoto focal length range.

Embodiments

Now described are three different Embodiments of the lens focusing system and method of the present invention based on zoom lens 10 of FIG. 1, described above. In the Embodiments set forth below, an aspheric surface is defined by the following formula:

$$x = cy^2/\{1+(1-kc^2y^2)^{1/2}\} + C_4y^4 + C_6y^6 + \ldots$$

where y is height from the optical axis, x is the sag, c is curvature, k is the conic constant, and $C_4$, $C_6$, . . . are the aspheric coefficients.

The three Embodiments set forth below are described with reference to Tables 1a–e, 2a–c, and 3a–c, respectively. In the Tables "f" indicates the overall focal length of the zoom lens, "FNO" indicates f-number, "2ω" indicates angular field of view, and the refractive index n is at the D line ($\lambda$=587 nm). Furthermore, six focal length positions P1–P6, from the extreme wide-angle state (P1) to the extreme telephoto state (P6), are represented.

Also, as mentioned above, movement of the respective lens groups is axial and is positive when objectwise. Also, the movement undergone by the lens group in question when focusing on an object at an infinite distance while in lens state P1 (i.e., the extreme wide-angle state) is used. Furthermore, the ratios of movements of the respective lens groups are taken with respect to the first lens group during focusing from an infinite distance to a close distance.

Embodiment 1

Figure 2:
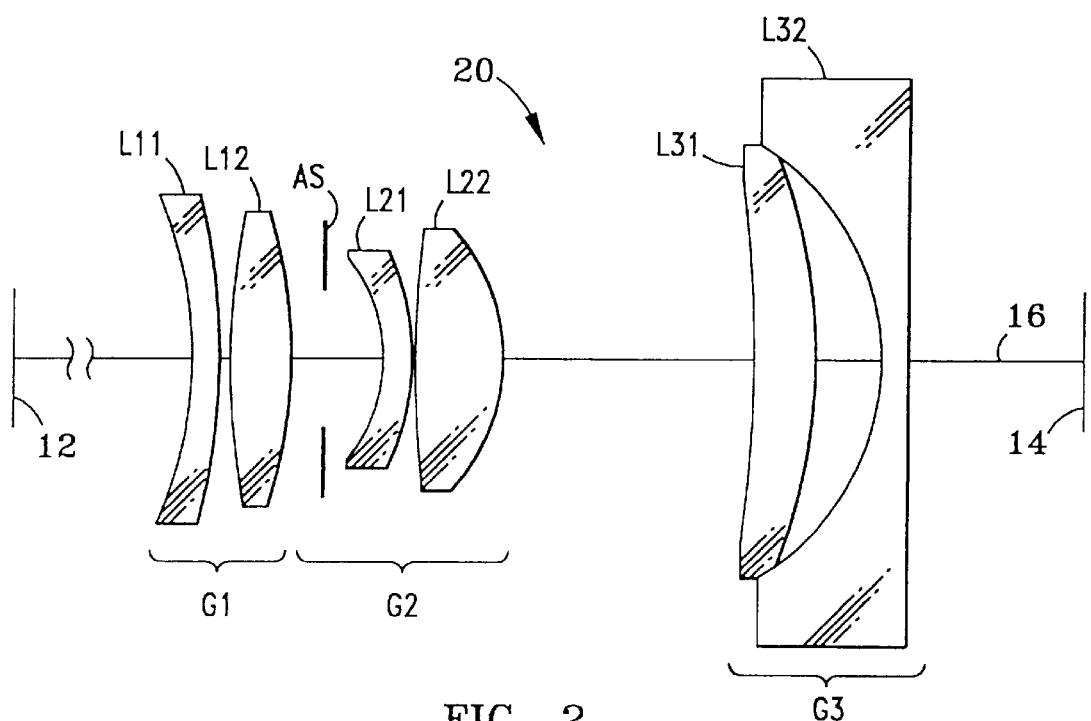
FIG. 2 is an optical sectional diagram of the lenses comprising the first through third embodiments of the zoom lens of the present invention.
Figure 3B:
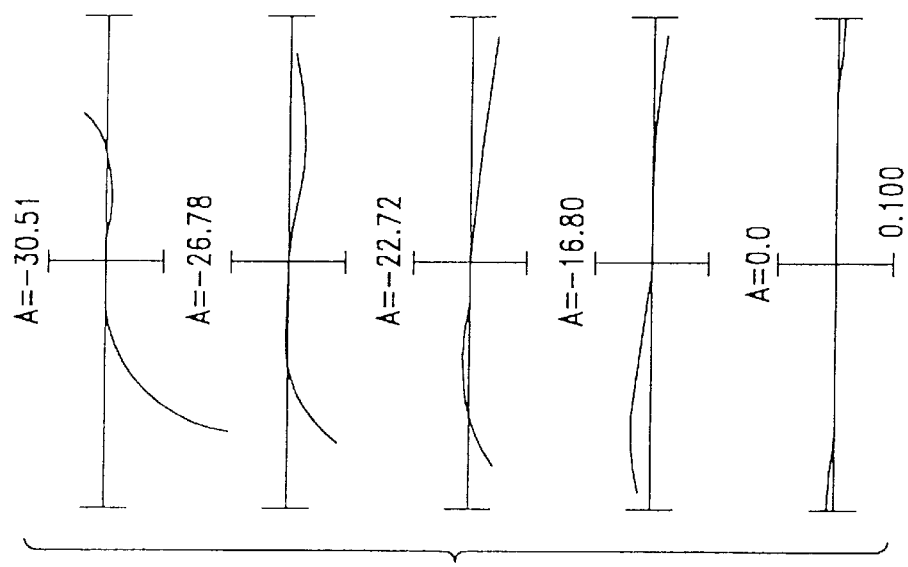
FIGS. 3B(I)–3B(IV) are aberration plots for spherical, astigmatism, distortion and coma, respectively, for the first embodiment of the present invention, when focused on an object at an infinite distance while the zoom lens is in lens positional state P2.
Figure 3B:
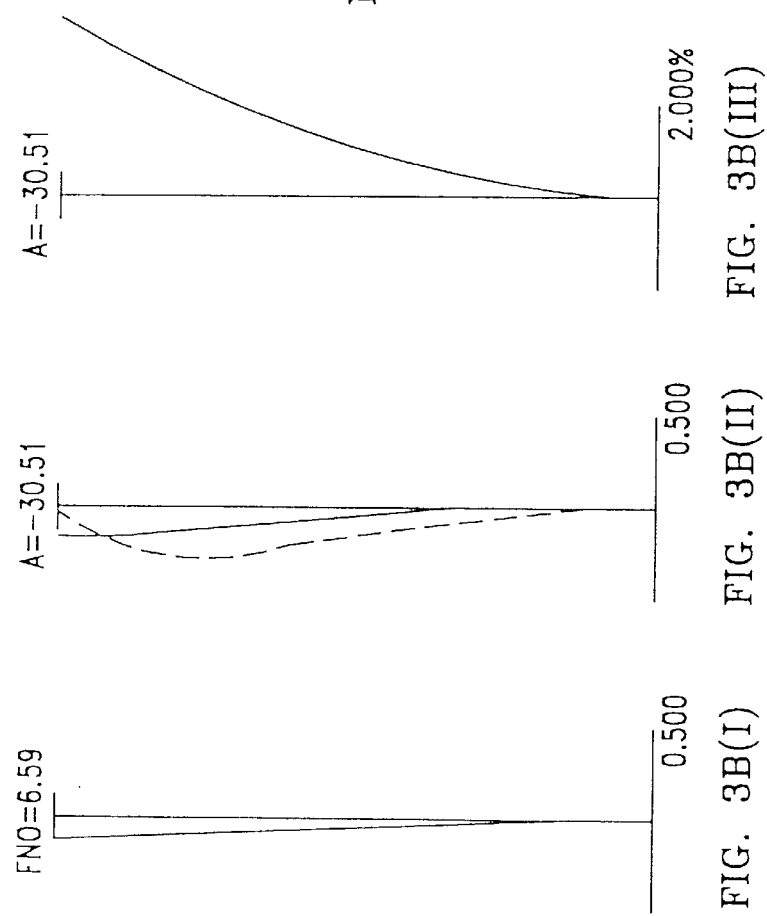
Figure 3G:
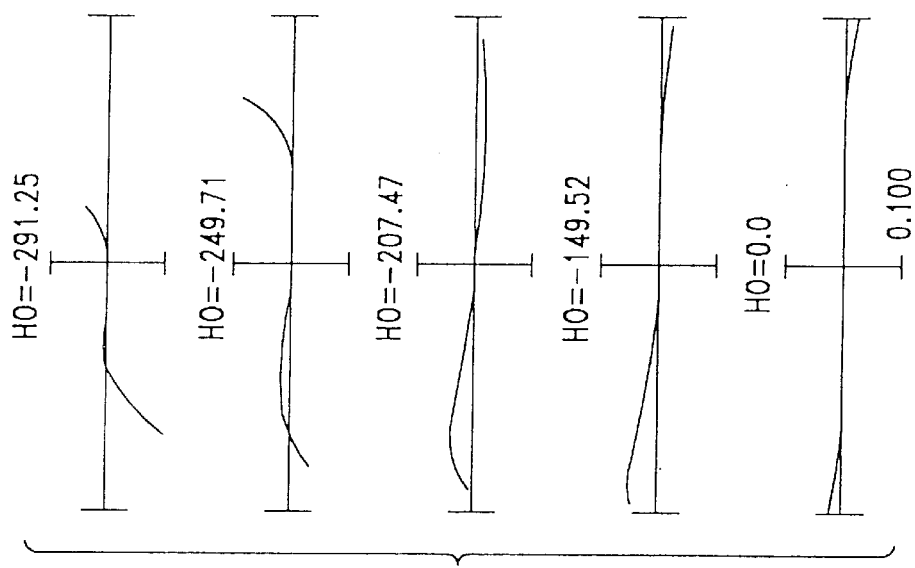
FIGS. 3G(I)–3G(IV) are aberration plots for spherical, astigmatism, distortion and coma, respectively, for the first embodiment of the present invention, when focused on an object at a distance of 0.45 m while in lens state P1 (the extreme wide-angle state)
Figure 3G:
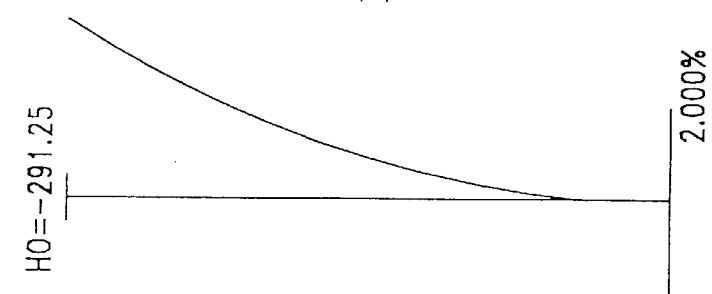
Figure 3G:
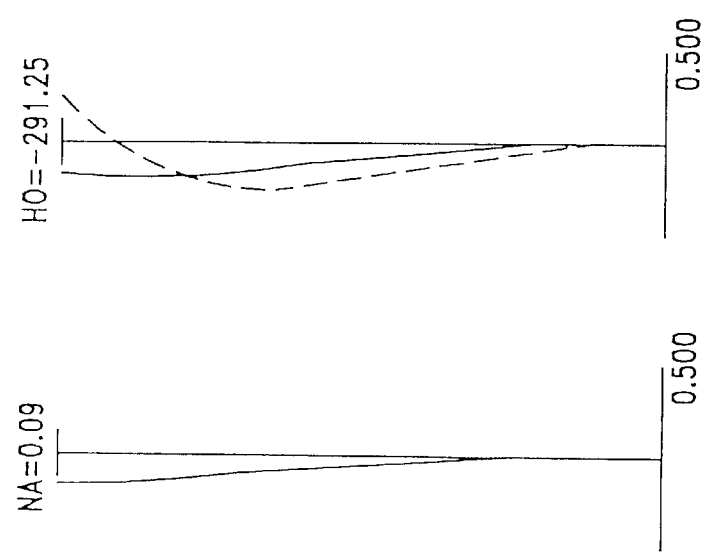
Figure 3I:
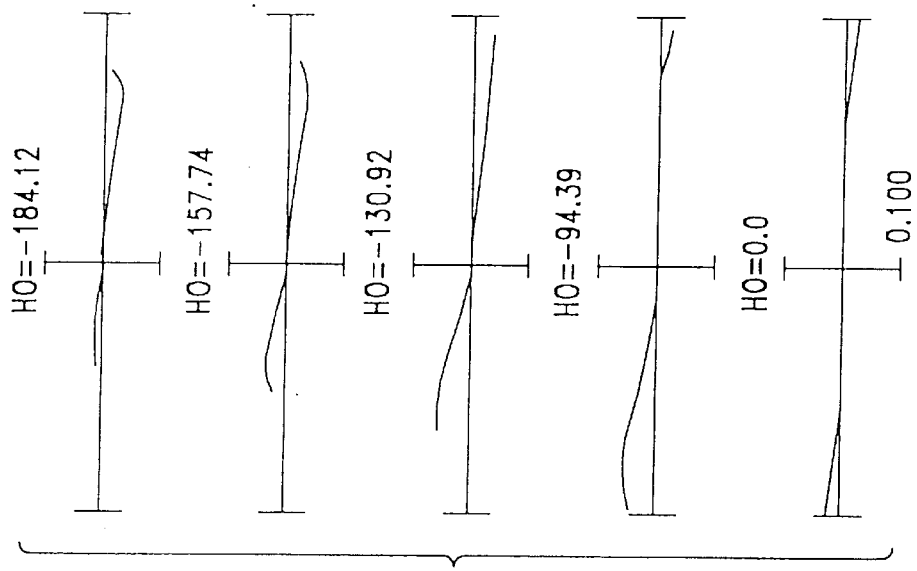
FIGS. 3I(I)–3I(IV) are aberration plots for spherical, astigmatism, distortion and coma, respectively, for the first embodiment of the present invention, when focused on an object at a distance of 0.45 m while in lens state P3.
Figure 3I:
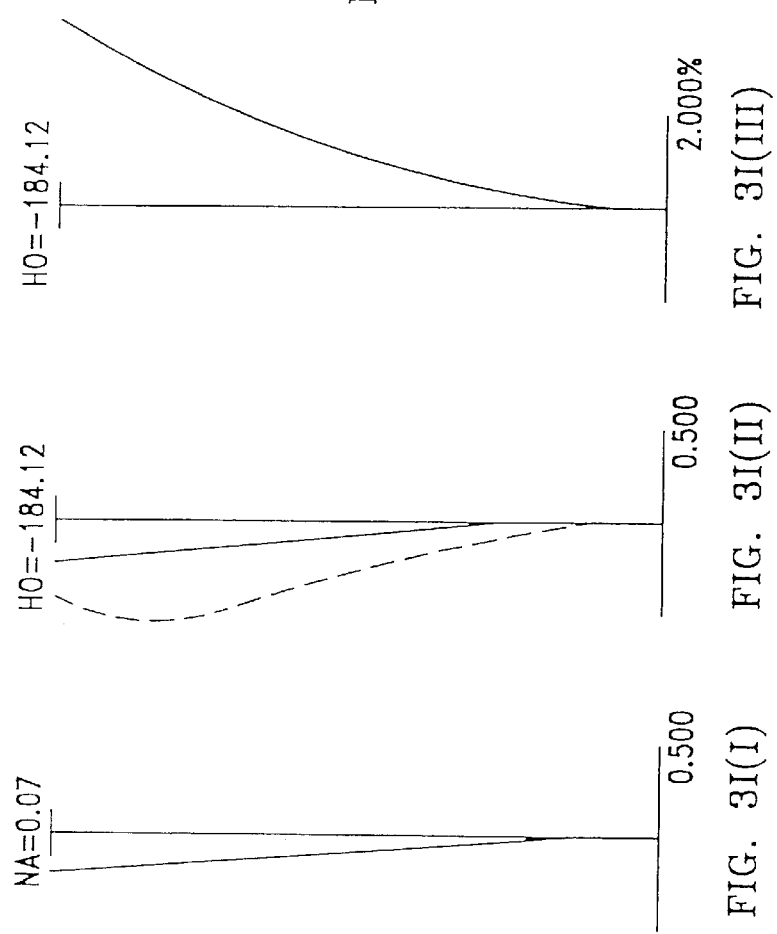
Figure 3K:
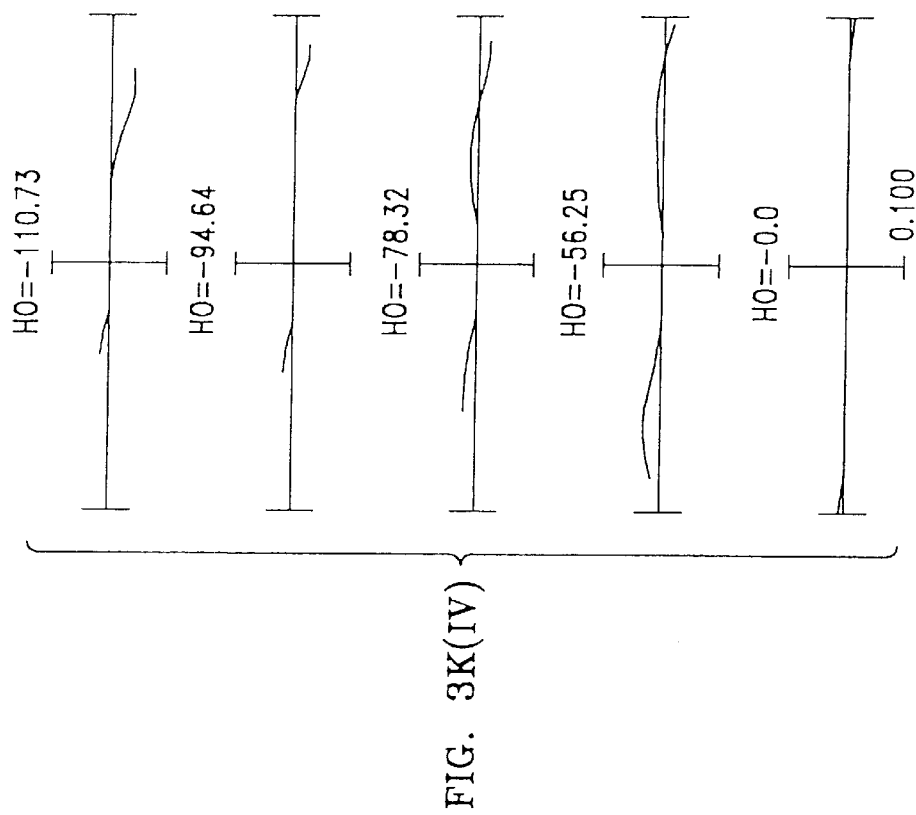
FIGS. 3K(I)–3K(IV) are aberration plots for spherical, astigmatism, distortion and coma, respectively, for the first embodiment of the present invention, when focused on an object at a distance of 0.45 m while in lens state P5.
Figure 3K:
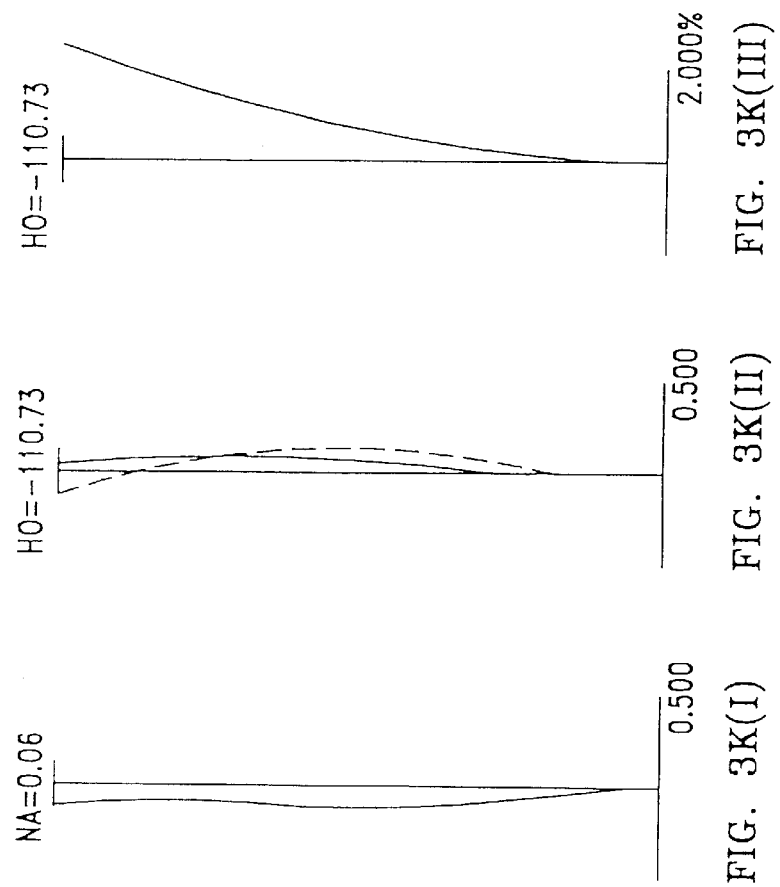

With reference to FIG. 2, zoom lens 20 includes a first lens group G1 comprising a negative meniscus lens L11 having an objectwise concave surface, and a biconvex lens L12. Zoom lens 20 further includes a second lens group G2 comprising an aperture stop AS, a negative meniscus lens L21 having an objectwise concave surface, and a biconvex lens L22. Also included in zoom lens 20 is a third lens group G3 comprising a positive meniscus lens L31 having an objectwise concave surface, and negative meniscus lens L32 having an objectwise concave surface.

Focusing on an object at a close distance is carried out in the first Embodiment by causing first lens group G1, second lens group G2, and third lens group G3 to move axially, with the movement ratios governing their movement amounts varying with overall focal length. Data relating to the first Embodiment of the present invention are presented in Tables 1a through 1f, below.

TABLE 1a

DESIGN TABLE

| f | 23.10 | 28.18 | 33.89 | 42.33 | 53.09 | 66.08 |
|---|---|---|---|---|---|---|
| FNO | 5.64 | 6.59 | 6.29 | 6.39 | 7.73 | 8.56 |
| 2ω | 71.90 | 61.02 | 52.19 | 42.98 | 35.04 | 28.62° |

TABLE 1b

DESIGN TABLE

| S | r | d | n | ν |
|---|---|---|---|---|
| 1 | −14.6478 | 0.900 | 1.74950 | 35.19 |
| 2 | −26.5152 | 0.400 | 1.0 | |
| 3 | 36.1394 | 2.100 | 1.48749 | 70.45 |
| 4 | −18.9401 | (D4) | 1.0 | |
| 5 | ∞ | 2.000 | 1.0 | (aperture stop) |
| 6 | −5.8986 | 0.900 | 1.74400 | 45.00 |
| 7 | −9.5712 | 0.100 | 1.0 | |
| 8 | 79.3344 | 3.100 | 1.51450 | 63.05 |
| 9 | −6.8265 | (D9) | 1.0 | |
| 10 | −28.6500 | 2.000 | 1.66547 | 55.18 |
| 11 | −21.3549 | 2.400 | 1.0 | |
| 12 | −8.9870 | 0.900 | 1.69350 | 53.75 |
| 13 | −583.7150 | (Bf) | 1.0 | |

TABLE 1c

ASPHERIC COEFFICIENTS

| S9 | κ = 0.5000 | $C_4 = +1.46070 \times 10^{-4}$ | $C_6 = +1.76610 \times 10^{-6}$ |
|---|---|---|---|
| /// | $C_8 = -1.57060 \times 10^{-7}$ | $C_{10} = +4.43300 \times 10^{-9}$ | |
| S10 | κ = 1.5000 | $C_4 = +1.43800 \times 10^{-4}$ | $C_6 = +7.40000 \times 10^{-7}$ |
| /// | $C_8 = -1.70000 \times 10^{-8}$ | $C_{10} = +2.56000 \times 10^{-10}$ | |

TABLE 1d

TABLE OF VARIABLE DISTANCES
FOCUSED ON OBJECT AT ∞

| Lens State | P1 | P2 | P3 | P4 | P5 | P6 |
|---|---|---|---|---|---|---|
| f | 23.100 | 28.177 | 33.888 | 42.333 | 53.090 | 66.078 |
| D4 | 1.200 | 3.477 | 6.395 | 8.027 | 9.620 | 10.800 |
| D9 | 8.958 | 7.221 | 5.825 | 4.327 | 3.041 | 2.001 |
| Bf | 6.241 | 10.118 | 13.929 | 20.290 | 28.198 | 37.794 |
| Movement of 1st Lens Group | 0.000 | 4.415 | 9.750 | 16.245 | 24.460 | 34.195 |
| Movement of 2nd Lens Group | 0.000 | 2.140 | 4.555 | 9.418 | 16.040 | 24.596 |
| Movement of 3rd Lens Group | 0.000 | 3.877 | 7.688 | 14.049 | 21.956 | 31.552 |

TABLE 1e

TABLE OF VARIABLE DISTANCES
CLOSE-DISTANCE (0.45 m) FOCUS

| Lens State | P1 | P2 | P3 | P4 | P5 | P6 |
|---|---|---|---|---|---|---|
| D4 | 1.380 | 4.020 | 5.982 | 7.644 | 9.091 | 9.844 |
| D9 | 9.427 | 7.749 | 6.030 | 4.638 | 3.382 | 2.734 |
| Bf | 6.507 | 10.370 | 16.267 | 23.422 | 33.451 | 41.026 |
| Movement of 1st Lens Group | 0.915 | 5.740 | 11.880 | 19.305 | 29.525 | 37.205 |
| Movement of 2nd Lens Group | 0.735 | 2.920 | 7.098 | 12.861 | 21.634 | 28.561 |
| Movement of 3rd Lens Group | 0.266 | 4.128 | 10.026 | 17.181 | 27.210 | 34.785 |
| Movement Ratio for Focusing (G2/G1) | 0.804 | 0.588 | 1.194 | 1.125 | 1.104 | 1.317 |
| Movement Ratio for Focusing (G3/G1) | 0.291 | 0.190 | 1.098 | 1.024 | 1.037 | 1.074 |

TABLE 1f

DESIGN CONDITION VALUES
$f_W^{3/4} \cdot f_T^{1/4} = 30.04$

| Lens State | P1 | P2 | P3 | P4 | P5 | P6 |
|---|---|---|---|---|---|---|
| (1) Δ1 | 0.915 | 1.325 | 2.130 | 3.060 | 5.065 | 3.010 |
| (2) Δ2 | 0.735 | 0.780 | 2.543 | 3.443 | 5.594 | 3.965 |
| (3) Δ2W/Δ1W | 0.804 | | | | | |
| (4) Δ3T/Δ2T | | | | | | 0.815 |
| (7) Δ3L/Δ2L | | 0.323 | | | | |
| (8) Δ3H/Δ2H | | | 0.920 | 0.910 | 0.939 | |

FIGS. 3A–3L are aberration plots relating to the first Embodiment of the present invention. FIGS. 3A–3F are aberration plots when focused on an object at an infinite distance while in the several lens states, and FIGS. 3G–3L are aberration plots when focused on an object at a close distance (0.45 m), while in the several lens states. In the spherical aberration plots (3A(I)–3L(I)), NA indicates numerical aperture, and in the astigmatism plots (3AB(II)–3L(II)), the solid line indicates the sagittal image plane, while the broken line indicates the meridional image plane. Also, "A" indicates angle of incidence (°), and "HO" indicates object height (mm). The plots of coma (3A(IV)–3L(IV)) show coma for several angles of incidence and object heights. From the aberration curves, it is clear that the first Embodiment displays only small variations in aberrations during focusing on an object at a close distance, is satisfactorily corrected for the various types of aberrations, and has very good imaging performance.

Embodiment 2

The basic configuration of the lenses in the second Embodiment of the zoom lens system and method of the present invention is the same as that of the first Embodiment, described above (see FIG. 2). In the second Embodiment, focusing on an object at a close distance is carried out by causing first lens group G1, second lens group G2, and third lens group G3 to move axially, with the movement ratios governing their movement amounts varying with overall focal length. Data pertaining to the second Embodiment of the present invention are presented in Tables 1b–c and Tables 2a–d, below.

TABLE 2a

DESIGN TABLE

| f | 23.10 | 26.61 | 32.17 | 41.44 | 50.06 | 66.01 |
| FNO | 5.64 | 6.29 | 6.60 | 6.42 | 6.81 | 8.55 |
| 2ω | 71.90 | 63.96 | 54.60 | 43.88 | 37.01 | 28.65° |

TABLE 2b

TABLE OF VARIABLE DISTANCES
FOCUSED ON OBJECT AT ∞

| Lens State | P1 | P2 | P3 | P4 | P5 | P6 |
|---|---|---|---|---|---|---|
| f | 23.100 | 26.608 | 32.173 | 41.437 | 50.056 | 66.014 |
| D4 | 1.200 | 2.960 | 5.040 | 6.800 | 8.628 | 10.800 |
| D9 | 8.958 | 7.709 | 6.191 | 4.466 | 3.369 | 2.005 |
| Bf | 6.241 | 8.885 | 13.046 | 20.236 | 26.390 | 37.742 |
| Movement of 1st Lens Group | 0.000 | 3.149 | 7.878 | 15.103 | 21.988 | 34.147 |
| Movement of 2nd Lens Group | 0.000 | 1.389 | 4.038 | 9.503 | 14.560 | 24.548 |
| Movement of 3rd Lens Group | 0.000 | 2.644 | 6.806 | 13.995 | 20.149 | 31.500 |

TABLE 2c

CLOSE-DISTANCE (0.45 m) FOCUS

| Lens State | P1 | P2 | P3 | P4 | P5 | P6 |
|---|---|---|---|---|---|---|
| D4 | 1.344 | 3.168 | 5.392 | 7.280 | 9.428 | 11.935 |
| D9 | 9.485 | 8.329 | 6.665 | 4.926 | 3.643 | 2.742 |
| Bf | 6.385 | 8.880 | 13.761 | 21.696 | 30.421 | 38.266 |
| Movement of 1st Lens Group | 0.815 | 3.978 | 9.418 | 17.503 | 27.094 | 36.544 |
| Movement of 2nd Lens Group | 0.671 | 2.010 | 5.226 | 11.423 | 18.865 | 25.809 |
| Movement of 3rd Lens Group | 0.143 | 2.638 | 7.519 | 15.454 | 24.180 | 32.025 |
| Movement Ratio for Focusing (G2/G1) | 0.823 | 0.749 | 0.771 | 0.800 | 0.843 | 0.526 |
| Movement Ratio for Focusing (G3/G1) | 0.176 | −0.007 | 0.464 | 0.608 | 0.790 | 0.219 |

TABLE 2d

DESIGN CONDITION VALUES
$f_{w^{3/4}} \cdot f_{T^{1/4}} = 30.03$

| Lens State | P1 | P2 | P3 | P4 | P5 | P6 |
|---|---|---|---|---|---|---|
| (1) Δ1 | 0.815 | 0.829 | 1.540 | 2.400 | 5.106 | 2.397 |
| (2) Δ2 | 0.671 | 0.621 | 1.188 | 1.920 | 4.305 | 1.261 |
| (3) Δ2W/Δ1W | 0.823 | | | | | |
| (4) Δ3T/Δ2T | | | | | | 0.416 |
| (7) Δ3L/Δ2L | | −0.009 | | | | |
| (8) Δ3H/Δ2H | | | | 0.602 | 0.760 | 0.937 |

The aberration plots for the second embodiment, which are readily generated from the design data provided above, are similar to those in FIGS. 3A–3L of Embodiment 1 and thus are not included. Like the first Embodiment, this second Embodiment displays only small variations in aberrations during focusing on an object at a close distance, is satisfactorily corrected for the various types of aberrations, and has very good imaging performance.

Embodiment 3

The basic configuration of the lenses in the third Embodiment of the zoom lens system and method of the present invention is the same as that of the first Embodiment, described above (see FIG. 2). In the third Embodiment, as in the previous Embodiments, focusing on an object at a close distance is carried out by causing first lens group G1, second lens group G2, and third lens group G3 to move axially, with the movement ratios governing their movement varying with overall focal length. Data pertaining to the third Embodiment of the present invention are presented at Tables 1b–c and Tables 3a–d, below.

TABLE 3a

DESIGN TABLE

| f | 23.10 | 26.36 | 31.01 | 38.87 | 48.65 | 64.10 |
| FNO | 5.64 | 6.23 | 6.41 | 6.08 | 6.70 | 8.36 |
| 2ω | 71.90 | 64.44 | 56.33 | 46.41 | 38.00 | 29.46° |

TABLE 3b

TABLE OF VARIABLE DISTANCES
FOCUSED ON OBJECT AT ∞

| Lens State | P1 | P2 | P3 | P4 | P5 | P6 |
|---|---|---|---|---|---|---|
| f | 23.101 | 26.357 | 31.008 | 38.874 | 48.649 | 64.100 |
| D4 | 1.200 | 2.982 | 4.641 | 6.346 | 8.175 | 10.500 |
| D9 | 8.958 | 7.790 | 6.470 | 4.870 | 3.530 | 2.142 |
| Bf | 6.242 | 8.647 | 12.185 | 18.274 | 25.519 | 36.466 |
| Movement of 1st Lens Group | 0.000 | 3.020 | 6.896 | 13.091 | 20.824 | 32.708 |
| Movement of 2nd Lens Group | 0.000 | 1.237 | 3.455 | 7.945 | 13.849 | 23.408 |
| Movement of 3rd Lens Group | 0.000 | 2.405 | 5.943 | 12.033 | 19.277 | 30.224 |

TABLE 3c

CLOSE-DISTANCE (0.45 m) FOCUS

| Lens State | P1 | P2 | P3 | P4 | P5 | P6 |
|---|---|---|---|---|---|---|
| D4 | 1.355 | 3.184 | 4.982 | 6.842 | 8.950 | 11.600 |
| D9 | 9.480 | 8.320 | 6.830 | 5.140 | 3.798 | 2.824 |
| Bf | 6.395 | 8.903 | 13.247 | 20.596 | 29.331 | 37.575 |
| Movement of 1st Lens Group | 0.831 | 4.007 | 8.659 | 16.179 | 25.680 | 35.599 |
| Movement of 2nd Lens Group | 0.676 | 2.023 | 4.877 | 10.537 | 17.930 | 25.199 |
| Movement of 3rd Lens Group | 0.153 | 2.661 | 7.005 | 14.354 | 23.090 | 31.333 |
| Movement Ratio for Focusing (G2/G1) | 0.813 | 0.888 | 0.807 | 0.839 | 0.840 | 0.620 |
| Movement Ratio for Focusing (G3/G1) | 0.184 | 0.259 | 0.602 | 0.752 | 0.785 | 0.384 |

TABLE 3d

| | DESIGN CONDITION VALUES $f_W^{3/4} \cdot f_T^{1/4} = 29.81$ | | | | | |
|---|---|---|---|---|---|---|
| Lens State | P1 | P2 | P3 | P4 | P5 | P6 |
| (1) Δ1 | 0.831 | 0.987 | 1.763 | 3.088 | 4.856 | 2.891 |
| (2) Δ2 | 0.676 | 0.876 | 1.422 | 2.592 | 4.081 | 1.791 |
| (3) Δ2W/Δ1W | 0.813 | | | | | |
| (4) Δ3T/Δ2T | | | | | | 0.619 |
| (7) Δ3L/Δ2L | | 0.292 | | | | |
| (8) Δ3H/Δ2H | | | 0.747 | 0.895 | 0.934 | |

The aberration plots for the third Embodiment, which are readily generated from the design date provided above, are similar to those in FIGS. 3A–3L of Embodiment 1 and thus are not included. Like the first and second Embodiments, this third Embodiment displays only small variations in aberrations during focusing on an object at a close distance, is satisfactorily corrected for the various types of aberrations and has very good imaging performance.

As will be understood from the above description of the zoom lens focusing system and method of the present invention and its preferred Embodiments, the present invention is a zoom lens focusing system and method which exhibits only small variations in aberrations during zooming and permits good imaging performance to be maintained during focusing over all focal length states from the extreme wide-angle state to the extreme telephoto state.

While the present invention has been described in connection with preferred embodiments, it will be understood that it is not limited to those Embodiments. On the contrary, it is intended to cover all alternatives, modifications and equivalents as may be included within the spirit and scope of the invention as defined in the appended claims.

What is claimed is:

1. A method of focusing from an infinite to a close distance, the method comprising the steps of:

a) providing a zoom lens comprising a plurality of lens groups, each lens group being axially moveable so as to define a plurality of zoom lens positional states, said zoom lens having an overall focal length that varies as a function of said positional states, said plurality of lens groups comprising in order from an object-side, a first lens group having positive refractive power, a second lens group having positive refractive power and separated from said first lens group by a first air space, and a third lens group having negative refractive power and separated from said second lens group by a second air space, said plurality of zoom lens positional states including an extreme wide-angle positional state and an extreme telephoto positional state and designing said lens groups such that, when zooming from said extreme wide-angle state to said extreme telephoto state, said lens groups move toward the object-side so as to cause said first air space to increase, and said second air space to decrease; and b) focusing by moving each one of said plurality of lens groups such that ratios of amounts by which said lens groups move vary as a function of said overall focal length, including the step of moving said lens groups by respective amounts of movement such that ratios of said respective amounts of movement are a function of said overall focal length, and satisfying the conditions:

(1) Δ1>0
    (2) Δ2>0
    (3) Δ2W/Δ1W≦1.0
    (4) Δ3T/Δ2T≦1.0 wherein Δ1 and Δ2 are said amounts of movement for focusing by said first and said second lens groups, respectively, during focusing, Δ1W and Δ2W are said amounts of movement for focusing by said first and said second lens group, respectively, during focusing when said zoom lens is in said extreme wide-angle state, and Δ2T and Δ3T are said amounts of movement for focusing by said second and said third lens groups, respectively, during focusing when said zoom lens is in said extreme telephoto state, and wherein said amounts of movement are positive when toward the object-side.

2. A method of focusing according to claim 1, further wherein said step b) is performed to satisfy the conditions:

(7) −0.2<Δ3L/Δ2L<0.75
    (8) 0.4<Δ3H/Δ2H<0.98 over a wide-angle focal length range and a telephoto focal length range, respectively, said ranges given respectively by the conditions:

(5) $f_W < f \leq f_W^{3/4} \cdot f_T^{1/4}$
    (6) $f_W^{3/4} \cdot f_T^{1/4} < f < f_T$ wherein f is said overall focal length, $f_W$ is said overall focal length in said extreme wide-angle positional state, $f_T$ is said overall focal length in said extreme telephoto positional state, Δ2L and Δ3L are said amounts of movement for focusing by said second and said third lens groups, respectively, during said focusing while in said wide-angle focal length range, and Δ2H and Δ3H are said amounts of movement for focusing by said second and said third lens groups, respectively, during focusing while in said telephoto focal length range.

3. A zoom lens focusing system capable of focusing from an infinite to a close distance, the system comprising:

a) a zoom lens comprising a plurality of lens groups, each lens group being axially moveable so as to define a plurality of zoom lens positional states, said zoom lens having an overall focal length that varies as a function of said positional states, said plurality of lens group comprising, in order from an object-side, a first lens group having positive refractive power, a second lens group having positive refractive power and separated from said first lens group by a first air space, and a third lens group having negative refractive power and separated from said second lens group by a second air space, said plurality of zoom lens positional states including an extreme wide-angle positional state and an extreme telephoto positional state;

b) said zoom lens designed such that, when zooming from said extreme wide-angle state to said extreme telephoto state, said lens groups move toward the object-side so as to cause said first air space to increase, and said second air space to decrease;

c) said zoom lens designed such that, to achieve focusing for any of said positional states, each one of said plurality of lens groups moves such that ratios of amounts by which said lens groups move vary as a function of said overall focal length;

d) said zoom lens being further designed so that focusing from an infinite distance to a close distance is accomplished by moving said lens groups by respective amounts such that ratios of said respective amounts are a function of said overall focal length; and e) said zoom lens satisfies the conditions:

(1) $\Delta 1 > 0$ (2) $\Delta 2 > 0$ (3) $\Delta 2W/\Delta 1W \leq 1.0$ (4) $\Delta 3T/\Delta 2T \leq 1.0$ wherein $\Delta 1$ and $\Delta 2$ are said amounts of movement for focusing by said first and said second lens groups, respectively, during said focusing, $\Delta 1W$ and $\Delta 2W$ are said amounts of movement for focusing by said first and said second lens group, respectively, during said focusing when said zoom lens is in said extreme wide-angle state, and $\Delta 2T$ and $\Delta 3T$ are said amounts of movement for focusing by said second and said third lens groups, respectively, during said focusing when said zoom lens is in said extreme telephoto state, and wherein said amounts of movement for focusing are positive when toward the object-side.

4. A zoom lens focusing system according to claim 3, wherein said zoom lens has a wide-angle focal length range (5) and a telephoto focal length range (6) given respectively by (5) $f_W < f \leq f_W^{3/4} \cdot f_T^{1/4}$ (6) $f_W^{3/4} \cdot f_T^{1/4} < f < f_T$ and said zoom lens satisfies the conditions:

(7) $-0.2 < \Delta 3L/\Delta 2L < 0.75$ (8) $0.4 < \Delta 3H/\Delta 2H < 0.98$ wherein f is said overall focal length, $f_W$ is said overall focal length in said extreme wide-angle positional state, $f_T$ is said overall focal length in said extreme telephoto positional state, $\Delta 2L$ and $\Delta 3L$ are said amounts of movement for focusing by said second and said third lens groups, respectively, during focusing while in said wide-angle focal length range, and $\Delta 2H$ and $\Delta 3H$ are said amounts of movement for focusing by said second and said third lens groups, respectively, during focusing while in said telephoto focal length range.

* * * * *